United States Patent
Hamilton

(10) Patent No.: US 6,793,110 B2
(45) Date of Patent: Sep. 21, 2004

(54) MOTORCYCLE SADDLEBAG ASSEMBLY

(76) Inventor: William R. Hamilton, 2878 Dewitt Cir., Darlington, SC (US) 29532

( * ) Notice: Subject to any disclaimer, the term of this patent is extended or adjusted under 35 U.S.C. 154(b) by 34 days.

(21) Appl. No.: 10/324,745

(22) Filed: Dec. 19, 2002

(65) Prior Publication Data

US 2004/0118889 A1 Jun. 24, 2004

(51) Int. Cl.$^7$ .............................. B62J 9/00; E05B 65/00
(52) U.S. Cl. .......................... 224/413; 70/256; 224/428; 224/435
(58) Field of Search ................................ 224/413, 428, 224/429, 430, 435; 70/63, 69, 256; 220/211; 74/10 A; 280/288.4, 769; 296/37.1, 37.6

(56) References Cited

U.S. PATENT DOCUMENTS

| | | | |
|---|---|---|---|
| 2,527,433 A | 10/1950 | Rochelle | 224/32 |
| 2,594,643 A | 4/1952 | Gustisha | 268/74 |
| 2,768,532 A | 10/1956 | Russell | 74/424.8 |
| 4,817,977 A | 4/1989 | Bookbinder | 280/304 |
| 4,934,203 A | 6/1990 | Bailey et al. | 74/89 |
| 5,067,739 A | 11/1991 | Kuan | 280/304 |
| 5,147,077 A * | 9/1992 | Nakajima et al. | 224/413 |
| 5,779,032 A * | 7/1998 | Iimura et al. | 220/211 |
| 5,909,921 A * | 6/1999 | Nesbeth | 296/37.6 |
| 5,954,264 A | 9/1999 | Keller | 232/17 |
| 6,081,186 A * | 6/2000 | Adams | 70/69 |
| 6,338,260 B1 | 1/2002 | Cousins et al. | 70/2 |
| 6,409,064 B1 * | 6/2002 | Bayley | 296/37.6 |
| 6,428,076 B2 * | 8/2002 | Sumada et al. | 296/37.1 |

* cited by examiner

Primary Examiner—Gary E. Elkins
(74) Attorney, Agent, or Firm—McNair Law Firm, P.A.

(57) ABSTRACT

An automated motorcycle saddlebag including a storage tub for stowing items on the motorcycle. A lid is pivotally connected to the storage tub for covering the interior storage space of the storage tub. A powered lid actuator is carried by the storage tub for pivoting the lid between a closed condition covering the storage tub and an open condition allowing access to the storage tub. An elongated actuator arm of the lid actuator interconnects the lid actuator with the lid. A drive unit is connected with the actuator arm for reciprocating the arm to open and close the lid. A control unit is in communication with the drive unit for controlling power to the drive unit. A remote switch is in communication with the control unit for signaling the control unit to deliver power to the drive unit to operate the lid actuator to open and close the lid.

19 Claims, 5 Drawing Sheets

MOTORCYCLE SADDLEBAG ASSEMBLY

FIELD OF THE INVENTION

The present invention relates to motorcycle accessories for providing extra storage space, and more particularly, to a powered hard saddlebag having a keyless remote control for opening and closing a lid on the saddlebag to gain or prevent access, respectively.

BACKGROUND OF THE INVENTION

Due to the compact nature of motorcycles, storage space for personal items, repair equipment, and various accessories is limited. In order to increase the cargo capacity of a motorcycle, it has been known to attach a set of saddlebags. The saddlebags are typically carried on the rear portion of the motorcycle and hang off the rear fender using straps and brackets or are mounted more permanently to the motorcycle frame. Commonly, the saddlebags are made from soft cloth like or leather material, commonly known as a soft saddlebag, but are also made using hardened plastic material and the like to create what is commonly referred to as a hard saddlebag.

Typically, hard saddlebags use a manually operated locking mechanism that uses a key to operate the lock. Opening the lock allows a lid to be pivoted on a hinge attached to the saddlebag to gain access to the saddlebag interior. For example, U.S. Pat. No. 2,527,433 discloses a metal motorcycle saddle carrier that provides a pair of accessory storage compartments on each side of the rear tire. Each compartment has a hinged lid that is contoured to match the compartment shape. A lock is disposed on one end of the lid to engage the main body of the saddlebag and secure the lid closed. While such locks are sufficient to secure the lid of the saddlebag, they lack a functional and stylistic appeal desired among many riders. Additionally, when the saddlebag lid is already closed, it is easy for a rider to forget whether the lid may be locked or unlocked. Without manually manipulating the lock to see if it is open or closed, the rider has know way of knowing if the lid is secured, leading to possible theft of the contents stored in the saddlebag if the lid is in fact left unlocked.

Other saddlebags, such as that disclosed in U.S. Pat. No. 6,338,260 require a padlock to secure the lid in place. These saddlebags have a major drawback in that the padlock is loosely attached and jiggles around while the motorcycle is in motion. Such loose components are typically undesirable and lead to unnecessary wear and tear on the saddlebag. As with the above noted patent, this type of saddlebag also lacks a certain functional and stylistic appeal desired by many of today's riders.

Regardless of the type of lock used on the saddlebag, all the locks have external components that may be easily tampered with to gain access to the interior storage space. Thus, a saddlebag is needed that improves on the functionality, style, and tamp-resistance of the known prior art saddlebags.

Accordingly, it is an object of the present invention to provide a saddlebag that utilizes remote keyless operation to open and close a lid on the saddlebag to gain and restrict access to the interior storage space of the saddlebag.

It is an object of the present invention to provide a powered lid actuator mounted to the interior body of the saddlebag for raising and lowering the lid of the saddlebag, which preserves as much interior storage space as possible.

It is an object of the present invention to provide a functional and stylistic saddlebag with no exterior locking components that can be tampered with to gain access to the interior storage space.

SUMMARY OF THE INVENTION

The above objectives are accomplished according to the present invention by providing an automated saddlebag assembly on a motorcycle that includes a storage tub for attachment to the motorcycle having an interior storage space for carrying and storing items on the motorcycle. A lid is pivotally connected to the storage tub for covering the interior storage space of the storage tub to provide a protective covered container for carrying and storing the items.

A powered lid actuator is carried by the storage tub for pivoting the lid between a closed condition covering the storage tub, and an open condition allowing access to the storage tub interior storage space. An elongated actuator arm is included in the lid actuator interconnecting the lid actuator with the lid. The actuator arm has a first position retracted within the lid actuator, wherein the lid is held in the closed condition to cover the storage tub, and a second position extended out from the lid actuator, wherein the lid is held in the open condition for allowing access to the storage tub. A drive unit is operatively associated with the actuator arm for moving the actuator arm between the first position and the second position.

A control unit is in electronic communication with the drive unit for controlling a supply of electrical power to the drive unit causing the actuator arm to be retracted and extended between the first and second positions, respectively. A remote switch is in electronic communication with the control unit for signaling the control unit to deliver electrical power to the drive unit to operate the lid actuator and move the actuator arm to open and close the lid. As a result, a keyless automated saddlebag is provided for attachment to a motorcycle in which the lid of the saddlebag may be opened and closed at the touch of a button.

In order to properly secure the lid to the storage tub, the lid includes a prime anchor point for interconnecting with the actuator arm, so that when the actuator arm is retracted to the first position the lid is drawn tight against the storage tub to prevent flopping of the lid caused by wind and road vibrations. In the preferred embodiment, the lid is defined as having a center point between a first end and a second end of the lid that divides the lid into a first half and a second half. The prime anchor point is disposed within the first half of the lid and a hinge is included for pivotally connecting the first end of the lid to the storage tub. In this construction and arrangement, the prime anchor point ensures that the actuator arm is connected to the lid so that when the lid is moved to the closed condition it securely contacts the storage tub to provide a protective cover for the interior storage space.

The saddlebag includes a lower mounting member affixed to the storage tub for carrying the lid actuator, and an upper mounting member affixed to the lid at the prime anchor point for connecting the actuator arm to the lid. In the preferred embodiment, the lower mounting member is removably affixed to the storage tub with at least one attachment member. The attachment member is accessible from outside the storage tub so that the lid actuator can be detached from the storage tub to open the lid and gain access to the interior storage space of the storage tub in the event of lid actuator failure.

Advantageously, the lid actuator includes a housing pivotally connected to the lower mounting member, while the actuator arm is pivotally connected to the upper mounting member so that when the lid actuator is moved between the first position and the second position the lid actuator and actuator arm will pivot to prevent the actuator arm from binding up.

To cause the actuator arm to open and close the lid, the lid actuator includes an elongated threaded shaft disposed within the housing of the lid actuator being operatively associated with the actuator arm. Additionally, the actuator arm includes a hollow threaded chamber for receiving the threaded shaft so that the threading of the shaft cooperates with the threading of the hollow chamber to extend and retract the actuator arm. Preferably, the threading of the elongated threaded shaft and the hollow threaded chamber remain in constant taught contact free of slack to prevent the lid from flopping during movement of the motorcycle.

In the preferred embodiment, the drive unit is comprised of an electric motor, which is operatively connected to the elongated threaded shaft so that activation of the electric motor causes rotation of the threaded shaft to extend and retract the actuator arm through interaction of the threads with the hollow chamber of the actuator arm. The control unit is in electronic communication with the electric motor and the supply of electrical power for controlling delivery of power to the electric motor to activate and deactivate the electric motor to control rotation of the elongated threaded shaft. The remote switch is in electronic communication with the control unit for signaling the control unit to deliver electrical power from the supply of electrical power to the electric motor to activate the electric motor and turn the elongated threaded shaft to extend and retract the actuator arm.

In the preferred embodiment, the lid actuator produces a minimum torque of 50 ft/lbs. in the first position to secure the lid against the storage tub to prevent flopping of the lid by wind and road vibrations and to prevent unauthorized access to the storage tub.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
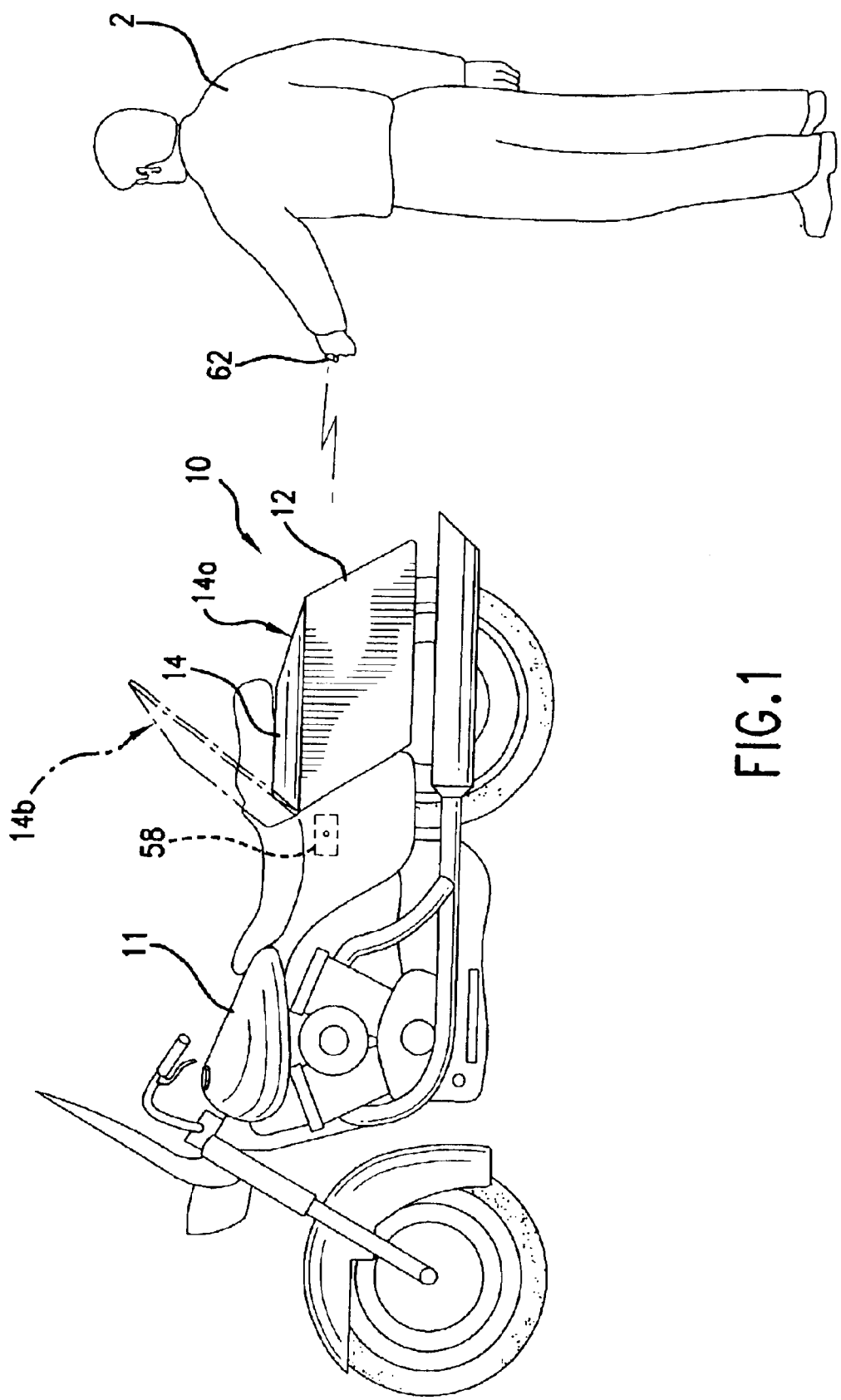
FIG. 1 shows a motorcycle having powered hard saddlebags according to the invention.
Figure 2:
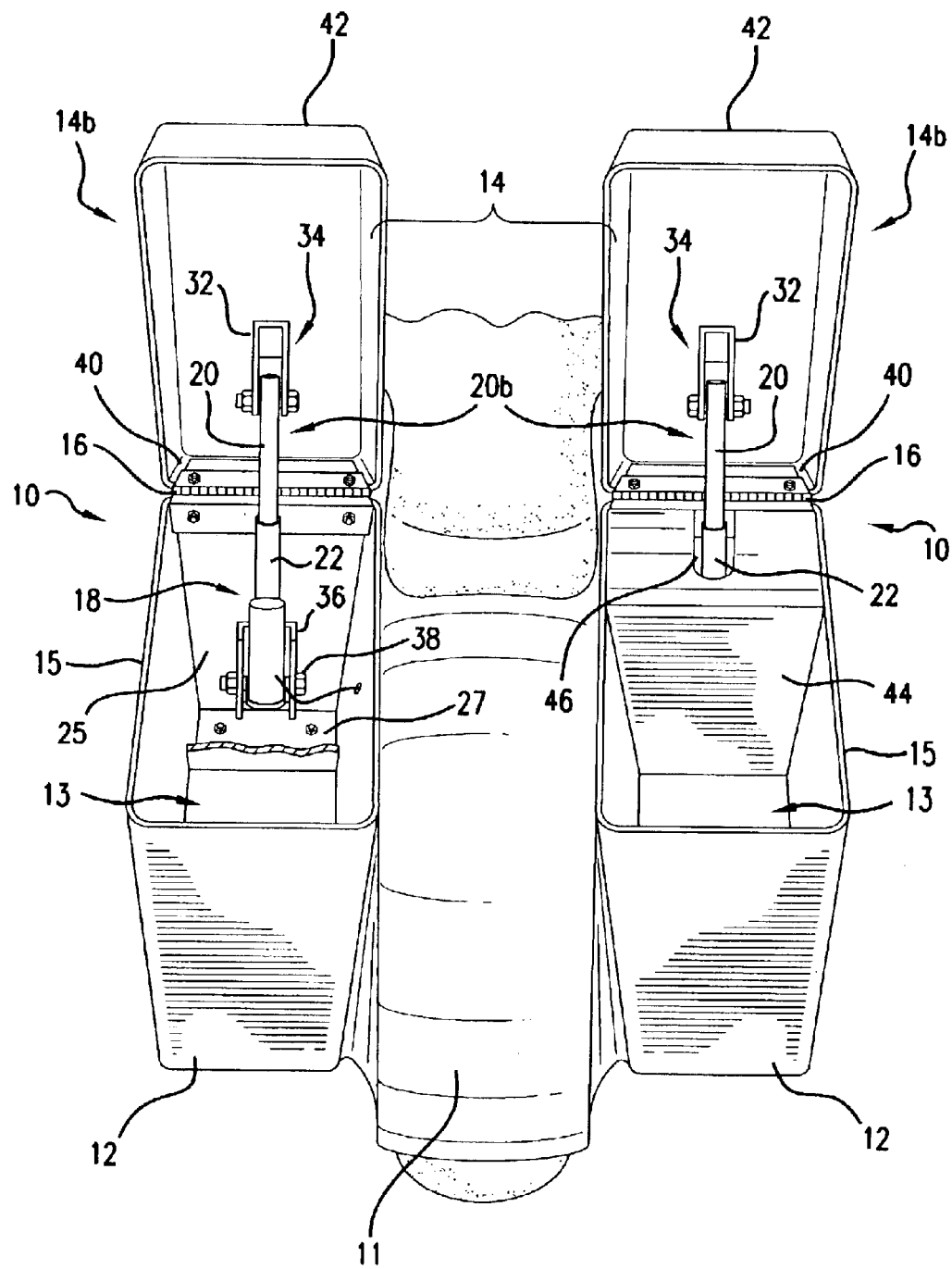
FIG. 2 shows a perspective view of hard saddlebags carried on the rear of a motorcycle in an open condition according to the invention.

In combination with reference to the drawings, the invention will now be described in more detail. Referring to FIGS. 1 and 2, an automated saddlebag, designated generally as 10, is shown attached to the side of a motorcycle 11 for added storage space. As illustrated in FIG. 1, a person 2 riding the motorcycle activates a remote switch device 70, which signals a control unit 58 to in turn activate a lid actuator 18 (FIG. 2) that opens and closes lid 14. Accordingly, a keyless automated saddlebag is provided so that manually manipulating a lock and opening and closing the lid of the saddlebag by hand is no longer required.

Typically, the saddlebag is mounted to the motorcycle using a plurality of attachment members such as screws, bolts, straps, and the like, that affix the saddlebag to the frame or body molding of the motorcycle. For illustrative purposes of the preferred embodiment, saddlebag 10 is a hard saddlebag made of plastic or other suitably durable material. However, the invention is not limited to use with a particular type of motorcycle saddlebag and can be adapted for use in both hard and soft saddlebags. As such, both types of saddlebags are considered within the spirit and scope of the present invention.

Figure 3:
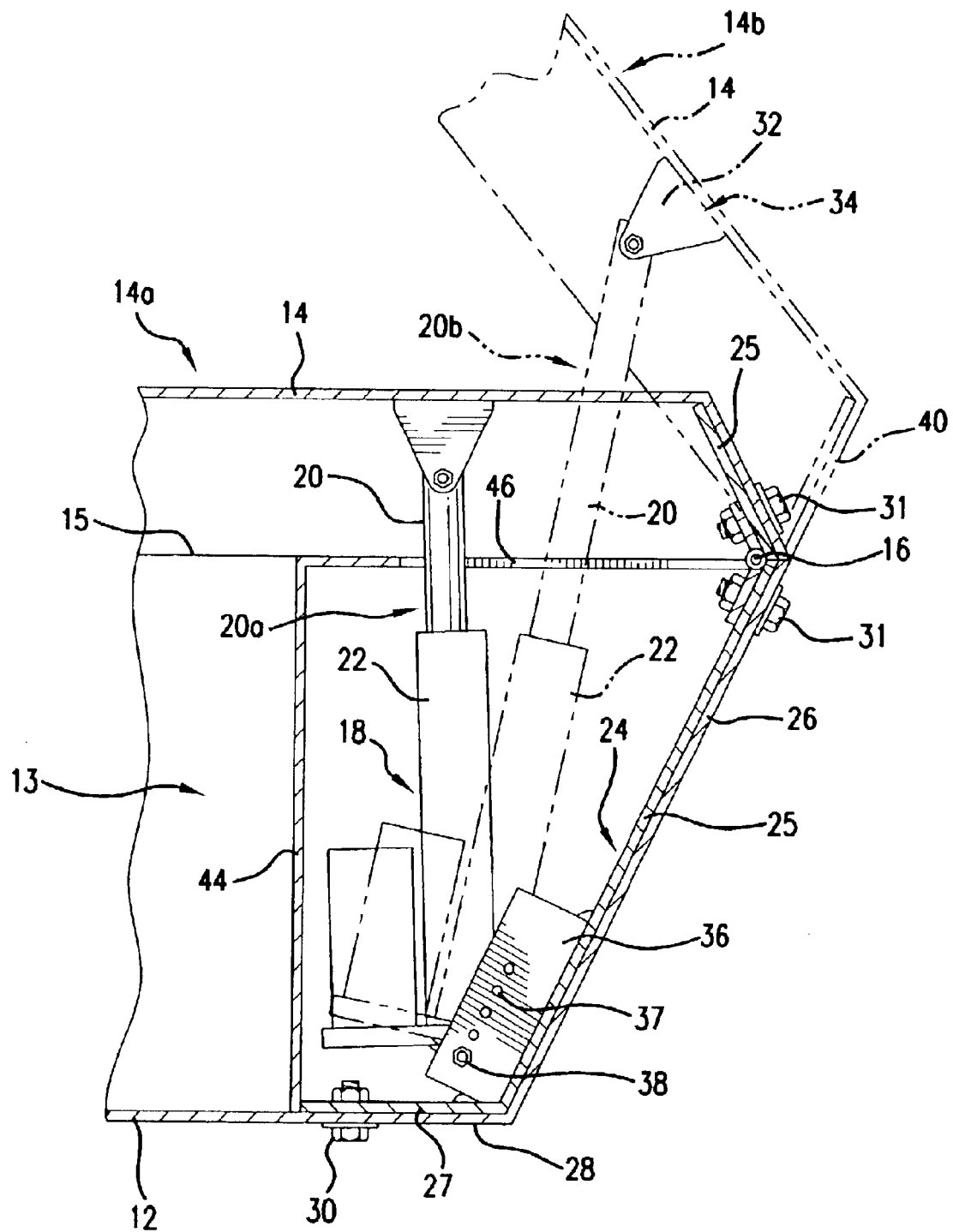
FIG. 3 shows a cut-away side view of a powered hard saddlebag lid actuator according to the invention.

The automated saddlebag includes a storage tub 12 having an interior storage space, designated generally as 13, for stowing items on a motorcycle. A lid 14 is carried by storage tub 12 for covering interior storage space 13 to provide a covered container for protecting items placed in the storage tub. As best illustrated by FIGS. 2 and 3, lid 14 is pivotally connected to storage tub 12 by hinge 16. Referring to FIG. 3, in this construction and arrangement, lid 14 can be pivoted on hinge 16 to a closed condition, designated generally as 14a, in which the lid is abutting an upper edge 15 of storage tub 12 to cover the storage tub and provide a closed container for stowing items. Lid 14 can then be pivoted to an open condition, designated generally as 14b, in which the lid is pivoted up from storage tub 12 to provide access to interior storage space 13 of the storage tub.

Referring to FIGS. 2 and 3, a powered lid actuator, designated generally as 18, is shown carried by storage tub 12 and operatively associated with lid 14 for pivoting lid 14 between closed condition 14a covering the storage tub, and open condition 14b allowing access to the storage tub interior storage space. As best shown in FIG. 3, an elongated actuator arm 20 is included in lid actuator 18 that interconnects lid 14 with lid actuator 18. Actuator arm 20 has a first position 20a retracted within a housing 22 of the lid actuator wherein lid 14 is held in closed position 14a to cover storage tub 12. Actuator arm 20 is moved to a second position extending out from housing 22 wherein lid 14 is held in open condition 14b for allowing access to interior storage space 13. As illustrated in FIG. 3, actuator arm 20 is not completely received in housing 22 of the lid actuator in order to remain interconnected to lid 14. Actuator arm 20 is reciprocated between first position 20a and second position 20b in such a manner that a greater portion of actuator arm 20 is received in housing 20 in the first position than in the second position, which results in the equivalence of a retracted and extended condition for the actuator arm in relation to housing 22.

Referring to FIGS. 2 and 3, a lower mounting member, designated generally as 24, is affixed to storage tub 12 by attachment members 30 and 31 for carrying lid actuator 18 within interior storage space 13. An upper mounting member 32 is affixed to lid 14 at a prime anchor point 34, described in detail below, for connecting actuator arm 20 to the lid. Lower mounting member 24 includes an upper portion 25 that runs along rear wall 26 of storage tub 12, and a lower portion 27 that extends across bottom wall 28 to reinforce storage tub 12 for carrying the lid actuator. Attachment members 30 secure lower portion 27 to bottom wall 28, while attachment members 31 are used to secure both hinge 16 and upper portion 25 of lower mounting member 24 to rear wall 26 and lid 14. Attachment members 30 can be screws, bolts, and other such securing means commonly known to a person skilled in the art, and are not limited to the nuts and bolts embodiment illustrated. While adhesives may also be used, it is preferable that lower mounting member 24 be removably attached to storage tub 12. In the preferred embodiment, attachment members 30 and 31 are accessible from the outside of storage tub 12 so that lower mounting member 24, and thereby lid actuator 18, can be detached from rear wall 26 of the storage tub to open the lid and gain access to the storage tub in the event of lid actuator failure. Otherwise, lid 14 could be permanently stuck in a closed position.

Additionally, housing 22 of lid actuator 18 is pivotally connected to bracket 36 included in lower mounting member 24, and actuator arm 20 is pivotally connected to said upper mounting member 32 so that when lid actuator 18 is moved between first position 20a and second position 20b, the lid actuator and actuator arm will pivot to prevent actuator arm from binding up in housing 22 and provide smoother operation. As shown in FIG. 3, bracket 36 includes a series of vertically aligned adjustment slots 37 for receiving a connecting member 38 which engages housing 22 of lid actuator 18 to pivotally attach the lid actuator to bracket 36. Adjustment slots 37 allow a user to vary the position of lid actuator 24 within storage tub 12 to accommodate different sizes of storage tubs. Additionally, in this construction and arrangement, the movement of lid 14 can be adjusted to allow for proper closure of lid 14 on storage tub 12 to create an effective seal for enclosing the interior storage space. Preferably, a rubber seal is carried by upper edge 15 of storage tub 12 for engaging lid 14 in the closed condition to provide a watertight storage compartment for stowing items.

As noted above, lid 14 includes a prime anchor point 34 for interconnecting the lid with actuator arm 20 so that when the actuator arm is retracted to the first position, lid 14 is drawn tight against the storage tub to prevent flopping caused by wind and road vibrations. To locate the prime anchor point, lid 14 is defined as having a center point between a first end 40 and a second end 42 of the lid that divides the lid into a first half and a second half. Prime anchor point 34 is disposed within the first half of the lid, which creates sufficient leverage on lid 14 to keep the lid firmly abutted against upper edge 15 of storage tub 12. If upper mounting member 32 is affixed on lid 14 to close or to far from hinge 16, the lid will not close with sufficient force, or not open far enough to provide easy access to the interior storage space. Accordingly, the prime anchor point is typically located at a position on lid 14 halfway between the center of the lid and hinge 16.

Preferably, an interior protective cover 44 is provided within storage tub 12 to prevent items carried in the storage tub from interfering in the operation of lid actuator 18. Interior protective cover 30 includes an actuator opening 46 for allowing the actuator arm of the lid actuator to interconnect with lid 14, as well as allowing the actuator arm to travel horizontally in the opening when pivoting to open and close the lid.

Figure 4:
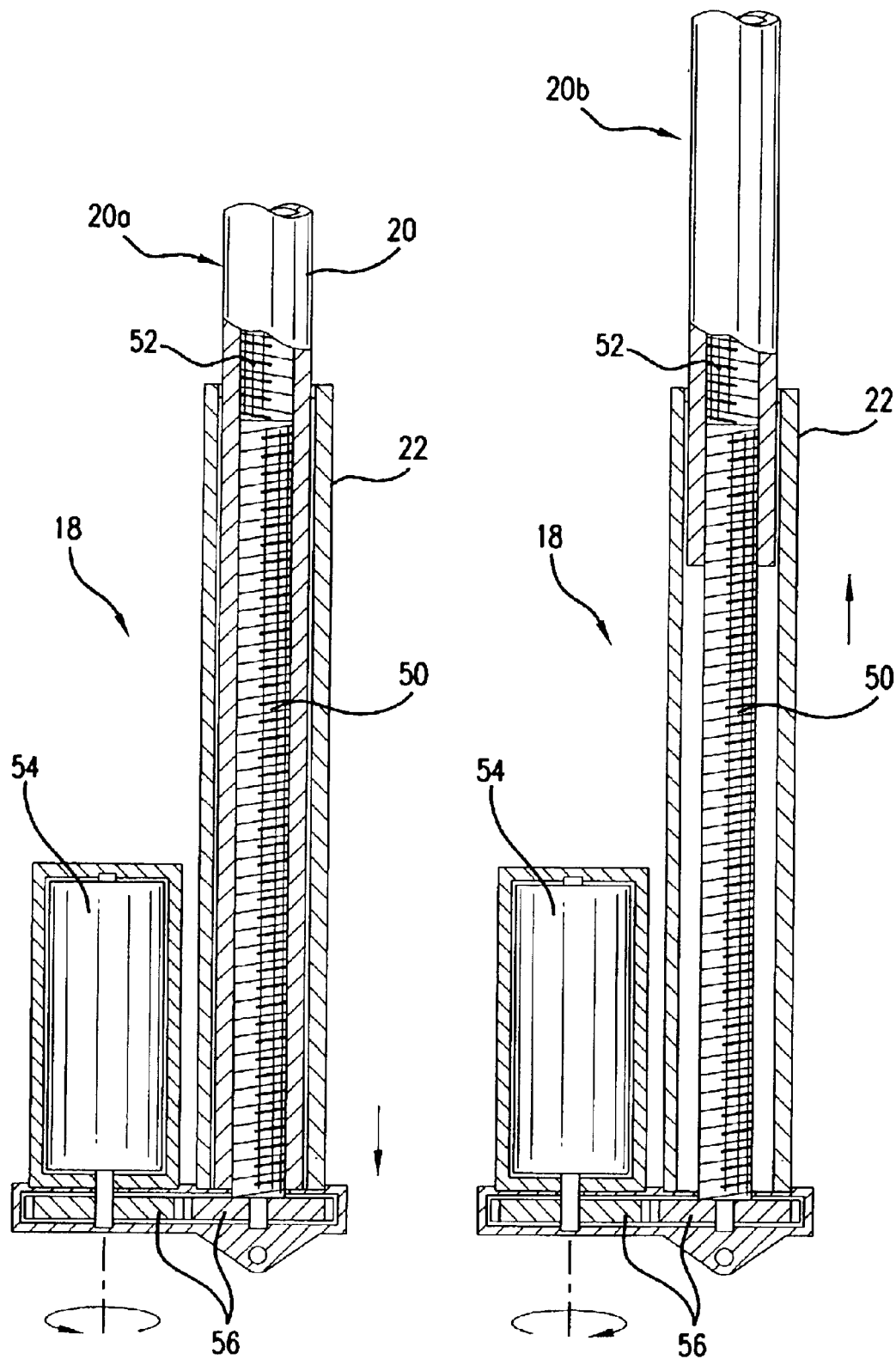
FIG. 4a shows a cross-section view of the lid actuator in a retracted position according to the invention.
FIG. 4b shows a cross-section view of the lid actuator in an extended position according to the invention.

Referring to FIGS. 4a and 4b, in order to move actuator arm 20 between first and second positions, lid actuator 18 includes an elongated threaded shaft 50 disposed within housing 22 of the lid actuator that engages with actuator arm 20. Actuator arm 20 includes a hollow threaded chamber 52 for receiving threaded shaft 50 so that the threading of the shaft cooperates with the threading of the chamber to extend and retract the actuator arm to open and close the lid. Preferably, the threading of elongated threaded shaft 50 and hollow threaded chamber 52 remain in constant taught contact free of slack to prevent the lid from flopping during movement of the motorcycle.

As shown in FIGS. 4a and 4b, a drive unit 54 is operatively associated with actuator arm 20 for reciprocating the actuator arm between first position 20a and second position 20b. In the preferred embodiment, drive unit 54 is an electric motor connected to elongated threaded shaft 50 by transfer gears 56. Activation of the electric motor causes rotation of transfer gears 56, which in turn causes rotation of threaded shaft 50 to cooperate with threaded hollow chamber 52 of actuator arm 20 to extend and retract the actuator arm. In the preferred embodiment, actuator arm 20 has a stroke length of approximately 4", which is sufficient to allow lid 14 to pivot up and away from storage tub 12 far enough to provide easy access to the interior storage space.

To restrict lid 14 from vibrating and otherwise shaking and moving while the motorcycle is in motion, electric motor 54 preferably produced a minimum torque of approximately 50 ft/lbs. This is a sufficient amount of pulling force on lid 14 to prevent road vibrations and wind buffeting against the lid from moving the lid when closed. Additionally, the 50 ft/lbs. of force exerted by the electric motor will also prevent unauthorized tampering with the saddlebag by preventing the lid from easily being opened.

Figure 5:
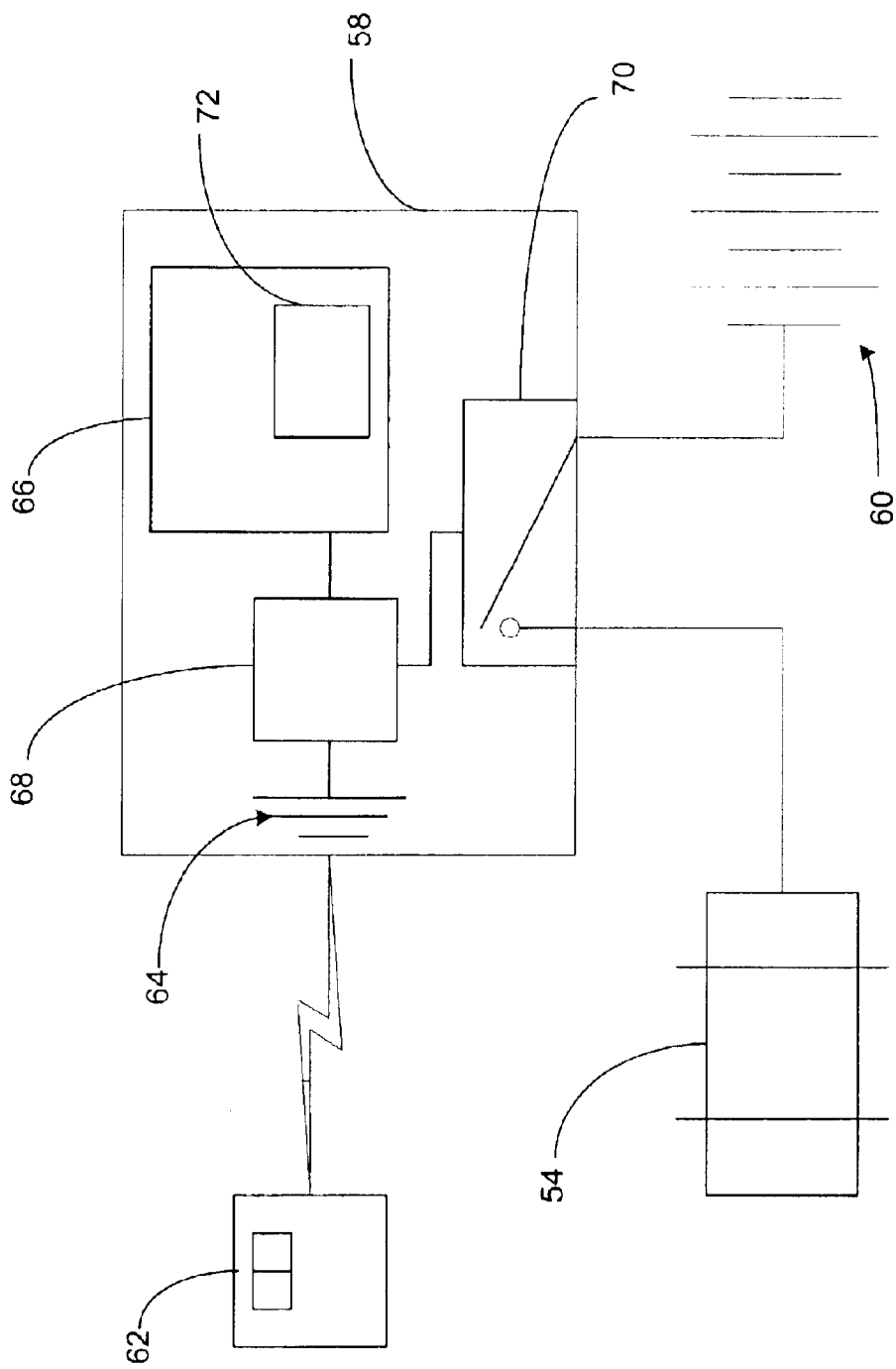
FIG. 5 shows a schematic of the powered hard saddlebag system according to the invention.

Referring to FIG. 5, a control unit 58 is provided in electronic communication with lid actuator 18 to control movement of lid 14 between closed condition 14a and open condition 14b. Control unit 58 is preferably disposed within storage tub 12, but may also be affixed to other protected areas of the motorcycle as shown in FIG. 1. In the preferred embodiment, control unit 58 is in electronic communication with electric motor 54 of the lid actuator. Control unit 58 is also in electronic communication with a supply of electrical power 60 for powering electric motor 54. Power supply 60 can be a self contained power supply carried by control unit 58, or preferably, the batter for the motorcycle. Control unit 58 controls delivery of electrical power to electric motor 54 to activate and deactivate the electric motor in order to control rotation of elongated threaded shaft 50.

Referring to FIG. 5, a remote switch 62 is in electronic communication with control unit 58 for signaling the control unit to deliver electrical power from power supply 60 to electric motor 54 to activate the electric motor and turn elongated threaded shaft 50 to extend and retract actuator arm 20 to open and close lid 14 as desired. To receive the signal from remote switch 62, control unit 58 includes a receiver 64. Receiver 64 is in electronic communication with a central processing unit (CPU) 66 contained in control unit 58 by way of input/output port 68. CPU 66 includes a computer readable medium 72 for recognizing the signal from remote switch 62. Upon receiving the proper signal from remote switch 62, CPU 66 signals a power switch 70, included in control unit 58, to close and thereby deliver power to electric motor 54 and operate the lid actuator to open and close the lid of the saddlebag.

While a preferred embodiment of the invention has been described using specific terms, such description is for illustrative purposes only, and it is to be understood that changes and variations may be made without departing from the spirit or scope of the following claims.

What is claimed is:

1. An automated saddlebag assembly for providing storage space on a motorcycle, said saddlebag assembly comprising:

a storage tub for attachment to a motorcycle having a pivotally attached lid for covering an interior storage space of said tub;

a powered lid actuator carried by a lower mounting member affixed within said storage tub, and including an elongated actuator arm connected to an upper mounting member affixed to said lid;

a drive unit included in said lid actuator operatively associated with said actuator arm for moving said actuator arm between a retracted position wherein said lid is closed and an extended position wherein said lid is open;

a control unit in electronic communication with said drive unit for controlling movement of said actuator arm to open and close said lid;

a remote switch in electronic communication with said control unit for signaling said control unit to operate said drive unit to extend and retract said actuator arm to open and closed said lid; and, said lower mounting member removably affixed to said storage tub with at least one attachment member; said attachment member being accessible from outside said storage tub so that said lid actuator can be detached from said storage tub to open said lid and pain access to said storage tub in the event of lid actuator failure;

whereby, a keyless automated saddlebag is provided for opening and closing the lid of the saddlebag.

2. The saddlebag of claim 1 wherein said lid includes a prime anchor point for interconnecting with said actuator arm at a single fixed point on said lid so that when said actuator arm is retracted to said first position said lid is drawn tight against said storage tub to prevent flopping caused by wind and road vibrations.

3. The saddlebag of claim 2 wherein said lid is defined as having a center point between a first end and a second end of said lid that divides said lid into a first half and a second half; said prime anchor point being disposed within said first half of said lid, and a hinge pivotally connecting said first end of said lid to said storage tub.

4. The saddlebag of claim 1 wherein said lid actuator includes a housing pivotally connected to said lower mounting member, and said actuator arm is pivotally connected to said upper mounting member so that when said actuator arm is extended and retracted the housing and actuator arm will pivot on said upper and lower mounts respectively, to prevent said actuator arm from binding up.

5. The saddlebag of claim 4 wherein said lid actuator includes an elongated threaded shaft disposed within said housing of said lid actuator being operatively associated with said actuator arm; said actuator arm including a hollow threaded chamber for receiving said threaded shaft so that the threading of the shaft cooperates with the threading of the chamber to extend and retract said actuator arm.

6. The saddlebag of claim 5 wherein said threading of said elongated threaded shaft and said hollow threaded chamber remain in constant taught contact free of slack to prevent said lid from flopping during movement of the motorcycle.

7. The saddlebag of claim 6 wherein said drive unit includes an electric motor; said electric motor being operatively connected to said elongated threaded shaft so that activation of said drive unit causes rotation of said threaded shaft to extend and retract said actuator arm.

8. The saddlebag of claim 7 wherein said control unit is in electronic communication with said drive unit and a supply of electrical power for controlling delivery of power to said drive unit to activate and deactivate said drive unit to control rotation of said elongated threaded shaft.

9. The saddlebag of claim 8 wherein said remote switch is in electronic communication with said control unit for signaling the control unit to deliver electrical power from said supply of electrical power to said drive unit to activate said drive unit and turn said elongated threaded shaft to extend and retract said actuator arm.

10. The saddlebag of claim 1 wherein said lid actuator produces a minimum torque of 50 ft/lbs. in said first position to secure said lid against said storage tub to prevent flopping of the lid by wind and road vibrations and to prevent unauthorized access to said storage tub.

11. In combination, a motorcycle and an automated saddlebag assembly for providing storage space on the motorcycle, wherein said saddlebag comprises:

a storage tub carried by said motorcycle having an interior storage space for stowing items;

a lid carried by said storage tub for covering said storage tub to protect items stowed in said interior storage space;

a powered lid actuator carried within said interior storage space connecting with said lid for moving said lid between a closed position covering said storage tub, and an open position for allowing access to the interior storage space of said storage tub;

said lid actuator including an elongated threaded shaft disposed within a housing of said lid actuator being operatively associated with an actuator arm connected to said lid; said actuator arm including a hollow threaded chamber for receiving said threaded shaft so that the threading of the shaft cooperates with the threading of the chamber to extend and retract said actuator arm to open and close said lid;

a control unit in electronic communication with said lid actuator for causing said lid actuator to open and close said lid; and a remote switch in electronic communication with said control unit for signaling said control unit to to operate said lid actuator to open and close said lid;

whereby, a keyless automated saddlebag is provided for opening and closing the lid of the saddlebag.

12. The saddlebag of claim 11 wherein said lid includes a prime anchor point for interconnecting with said actuator arm at a single fixed point on said lid so that when said lid is moved to said closed position said lid is drawn tight against said storage tub to prevent flopping caused by wind and road vibrations.

13. The saddlebag of claim 12 wherein said lid is defined as having a center point between a first end and a second end of said lid that divides said lid into a first half and a second half; said prime anchor point being disposed within said first half of said lid, and a hinge pivotally connecting said first end of said lid to said storage tub for allowing said lid to pivot between said closed position and said open position.

14. The saddlebag of claim 11 wherein said actuator arm has a first position retracted generally within said housing of said lid actuator wherein said lid is held in said closed position, and a second position generally extended out of said housing of said lid actuator wherein said lid is held in said open position.

15. The saddlebag of claim 11 including a drive unit operatively connected to said threaded shaft of said lid actuator for causing rotation of said threaded shaft to extend and retract said actuator arm to open and close said lid.

16. The saddlebag of claim 15 wherein said control unit is in electronic communication with said drive unit for controlling operation of said drive unit to extend and retract said actuator arm.

17. An automated saddlebag for providing storage space on a motorcycle, said saddlebag comprising:

storage means having an interior storage space for stowing items on a motorcycle;

cover means carried by said storage means for covering said storage mean means to protect items stowed in said interior storage space;

actuator means carried by said storage means interconnecting with said cover means for pivoting said cover means to cover and uncover said storage means;

said actuator means having a first position wherein said cover means is held in a closed condition preventing access to said interior storage space, and a second position wherein said cover means is held in an open condition allowing access to the interior storage space;

drive means operatively associated with said actuator means for moving said actuator means between said first position and said second position;

said actuator means operatively associated with said drive means to produce a minimum torque of 50 ft/lbs. in said first position to secure said lid against said storage tub to prevent flopping of the lid by wind and road vibrations and to prevent unauthorized access to said storage tub;

controller means in electronic communication with said drive means for activating and deactivating said drive means to move said actuator means between said first and second positions; and remote switch means in electronic communication with said controller means for signaling said controller means to activate and deactivate said drive means to move said actuator means to open and close said cover means.

18. The saddlebag of claim 17 wherein said cover means includes a prime anchor point for interconnecting said actuator means to a single fixed point on said cover means so that when said actuator means is moved to said first position said cover means is drawn tight against said storage means to prevent flopping of said cover means caused by wind and road vibrations.

19. The saddlebag of claim 18 wherein said cover means is defined as having a center point between a first end and a second end of said cover means that divides said cover means into a first half and a second half; said prime anchor point being disposed within said first half of said cover means, and hinge means pivotally connecting said first end of said cover means to said storage means for allowing said cover means to pivot between said closed condition and said open condition.

* * * * *